(12) United States Patent
Hasegawa et al.

(10) Patent No.: US 7,813,032 B2
(45) Date of Patent: Oct. 12, 2010

(54) METHODS TO CONTROL PHASE SHIFTS OF DELAY DEMODULATION DEVICES

(75) Inventors: Junichi Hasegawa, Tokyo (JP); Kazutaka Nara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 7 days.

(21) Appl. No.: 12/412,847

(22) Filed: Mar. 27, 2009

(65) Prior Publication Data
US 2010/0067098 A1    Mar. 18, 2010

(30) Foreign Application Priority Data
Mar. 27, 2008    (JP) ............... 2008-083639

(51) Int. Cl.
G02F 2/00    (2006.01)
(52) U.S. Cl. ............... 359/325; 385/1; 385/11
(58) Field of Classification Search .......... 385/1, 385/4, 11, 14; 359/325, 237
See application file for complete search history.

(56) References Cited

U.S. PATENT DOCUMENTS 6,546,161 B2 *  4/2003  Okuno et al. .............. 385/14
7,480,091 B2 *  1/2009  Hasegawa et al. ........... 359/325
2005/0058398 A1 *  3/2005  Doerr ...................... 385/39

FOREIGN PATENT DOCUMENTS

JP    2007-60442    3/2007

* cited by examiner

Primary Examiner—Hemang Sanghavi
(74) Attorney, Agent, or Firm—Oblon, Spivak, McClelland, Maier & Neustadt, L.L.P.

(57) ABSTRACT

The present invention provides methods to control phase shift of delay demodulation devices to reduce Polarization Dependent wavelength (PDλ) to be less than, for example, 0.5 GHz (i.e. 0.004 nm). The method to control phase shift in a Planar Lightwave Circuit (PLC) for demodulating Differential Quadrature Phase Shift Keying (DQPSK) comprising two Mach-Zehnder interferometers, each having two arm waveguides and heaters placed on the two arm waveguides, the method comprising the steps of: (first step) supplying electricity to at least one predetermined heater on the two arm waveguides of each Mach-Zehnder interferometer such that Polarization Dependent wavelength (PDλ) is reduced as electricity is supplied to the predetermined heaters; (second step) inserting a half-wave plate in the two arm waveguides of each Mach-Zehnder interferometer after PDλ is reduced in the first step; (third step) supplying electricity to the predetermined heater on the at least one of the two Mach-Zehnder interferometers used in the first step to control phases of the DQPSK signals after the half-wave plates are inserted.

4 Claims, 7 Drawing Sheets

Figure 7 the relationship between Polarization Dependent wavelength (PD λ) and the duration of electricity supply, and the relationship between wavelength shift and the duration of electricity supply

Figure 9 the spectrum of the delay demodulation device

METHODS TO CONTROL PHASE SHIFTS OF DELAY DEMODULATION DEVICES

TECHNICAL FIELD

The present invention relates to methods to control phase shift of delay demodulation devices used for optical fiber communication, and particularly to methods to control phase shift of Planar Lightwave Circuit (PLC)-type delay demodulation devices, which demodulate Differential Quadrature Phase Shift Keying (DQPSK) signals in Dense Wavelength Division Multiplexing (DWDM).

RELATED ARTS

Recently, with the rapid growth in broadband networks, high speed optical transmission systems (toward transmission rate of 40 Gbps) are being investigated actively. However, when the transmission rate is increased, the time duration per 1 bit of optical signal is reduced and, because of the characteristics of an optical fiber, wave shape is deteriorated, and therefore, the quality of a communication line is deteriorated. For 40 Gbps-class long distance transmission, transponders that transform an optical signal to an electrical signal and then transform the electrical signal back to an optical signal are needed in the transmission path. Therefore, it is difficult to create a high speed optical transmission system using existing optical fiber networks.

Because of this issue, research and development has been done in Differential Quadrature Phase Shift Keying (DQPSK). DQPSK reduces deterioration of signal-wave profile by increasing the time duration per bit of an optical signal.

DQPSK transmits four symbols of information as four corresponding optical phase shifts. In other words, each symbol of information corresponds to a value (0, 1, 2 or 3), which comprises two bits of data, and the symbols of information are transmitted by shifting the phase of carrier wave between adjacent symbols by an amount ($\theta$, $\theta+\pi/2$, $\theta+\pi$ or $\theta+3\pi/2$) determined by the pair of bits to be transmitted. 40 Gbps DQPSK transmission can transmit four times longer distance than conventional 40 Gbps transmission. Because of DQPSK, it is believed that construction of networks between large cities can be achieved using existing optical fiber networks. As delay demodulation devices to demodulate such DQPSK signals at receiving devices, for example, photo receiving circuits disclosed in Japanese Patent Application Laid-open 2007-60442 are known.

When delay detection is performed in 40 Gbps DQPSK signals, two PLC-type Mach-Zehnder interferometers are used to delay one symbol period (period for two bits).

In the 40 Gbps DQPSK transmission, the permissible value of Polarization Dependent wavelength (PD$\lambda$) in the delay demodulation device is said to be, for example, less than 0.5 GHz (i.e. 0.004 nm). As a way to reduce the PD$\lambda$, a half-wave plate can be inserted in two arm waveguides of the Mach-Zehnder interferometers. However, it is difficult to lower the PD$\lambda$ to be less than 0.5 GHz, and it also causes yield ratio as well. Also, the delay demodulation devices requires phase shift control (or phase shift trimming) to shift the phase of one Mach-Zehnder interferometer by $\pi/2$ radians with respect to the phase of the other Mach-Zehnder interferometer. For the phase shift control, a few dozen of volts are supplied to heaters (e.g. thin film heaters) on the two arm waveguides of the Mach-Zehnder interferometer(s); however, it also makes PD$\lambda$ large.

BRIEF SUMMARY OF THE INVENTION

The present invention provides methods to control phase shift of delay demodulation devices to reduce Polarization Dependent wavelength (PD$\lambda$) to be less than, for example, 0.5 GHz (i.e. 0.004 nm).

Inventors for the present invention found that when electric voltage is applied to the same heater(s) that electricity is supplied previously to reduce PD$\lambda$, wavelength shift continues with the duration of the supply; however, PD$\lambda$ is kept constant after certain amount of time. Also, they found that inserting a half-wave plate, when PD$\lambda$ is relatively small, further decreases PD$\lambda$.

To solve the above issue, a method to control phase shift in a Planar Lightwave Circuit (PLC) is invented. The method for control phase shift in the PLC for demodulating Differential Quadrature Phase Shift Keying (DQPSK) comprising two Mach-Zehnder interferometers, each having two arm waveguides having different lengths with respect to each other to receive a split DQPSK signal and having heaters placed on the two arm waveguides, the method comprising the steps of: (first step) supplying electricity to at least one predetermined heater on the two arm waveguides of each Mach-Zehnder interferometer such that Polarization Dependent wavelength (PD$\lambda$) is reduced as electricity is supplied to the predetermined heaters; (second step) inserting a half-wave plate in the two arm waveguides of each Mach-Zehnder interferometer after PD$\lambda$ is reduced in the first step; (third step) supplying electricity to the predetermined heater on the at least one of the two Mach-Zehnder interferometers used in the first step to control phases of the DQPSK signals after the half-wave plates are inserted.

According to the method, the reduced PD$\lambda$ (in first and second steps) is kept relatively constant, and, at the same time, the phase shift difference is $\pi/2$ radians between the first and second Mach-Zehnder interferometers. Also, after PD$\lambda$, is reduced in the first step, by inserting the half-wave plates in the center portions of the two arm waveguides of each Mach-Zehnder interferometer, PD$\lambda$ can be further reduced. After the half-wave plates are inserted, electricity is supplied again to the predetermined heater(s) on the at least one of the Mach-Zehnder interferometers used in the first step to control phases such that the phase of the first Mach-Zehnder interferometer is shifted by $\pi/2$ radians with respect to the phase of the second Mach-Zehnder interferometer. Because of that, the reduced PD$\lambda$ (in first and second steps) is kept relatively constant, and, at the same time, the phase shift difference is $\pi/2$ radians between the first and second Mach-Zehnder interferometers.

From the reasons above, the delay demodulation device to reduce PD$\lambda$ to be less than, for example, 0.5 GHz (i.e. 0.004 nm) is manufactured.

In the specification, PD$\lambda$ is the difference between TE polarization component and TM polarization component of two optical signals. The two optical signals are outputted from two output ports of each Mach-Zehnder interferometer and resulted from split DQPSK signals propagated through the Mach-Zehnder interferometers.

According to another method for control phase shift in the PLC, one heater is placed on each of the two arm waveguides of each Mach-Zehnder interferometer, and electricity is supplied to the predetermined heater on one of the two arm waveguides of each Mach-Zehnder interferometer such that PDX is reduced as electricity is supplied to the predetermined heater on each Mach-Zehnder interferometer.

According to another method for control phase shift in the PLC, two heaters are placed on each of the two arm waveguides of each Mach-Zehnder interferometer, and electricity is supplied to the two predetermined heaters on one of the two arm waveguides of each Mach-Zehnder interferometer such that PDλ is reduced as electricity is supplied to the predetermined heaters on each Mach-Zehnder interferometer.

According to another method for control phase shift in the PLC, when each of the inserted half-wave plates is fixed on the PLC after the second step, a predetermined location for each half-wave plate is decided by monitoring the PDλ such that the PDλ is minimized at the location.

According to the method, in the above second step, when the half-wave plates are inserted at the center portions of the two arm waveguides of Mach-Zehnder interferometers, each half-wave plate is fixed to the predetermined location on the PLC such that the PDλ is minimized. Such location can be found by monitoring the PDλ when the half-wave plates are fixed. By doing so, a delay demodulation device with low PDλ can be manufactured.

According to the present invention, the delay demodulation device to reduce PDλ to be less than, for example, 0.5 GHz is manufactured.

BRIEF DESCRIPTION OF THE DRAWINGS

The above and other objects and features of the invention will appear more fully hereinafter from a consideration of the following description taken into connection with the accompanying drawing wherein one example is illustrated by way of example, in which.

DETAILED DESCRIPTION OF THE INVENTION

Construction of the delay demodulation device is shown in FIG. 1 through FIG. 9.

Figure 1:
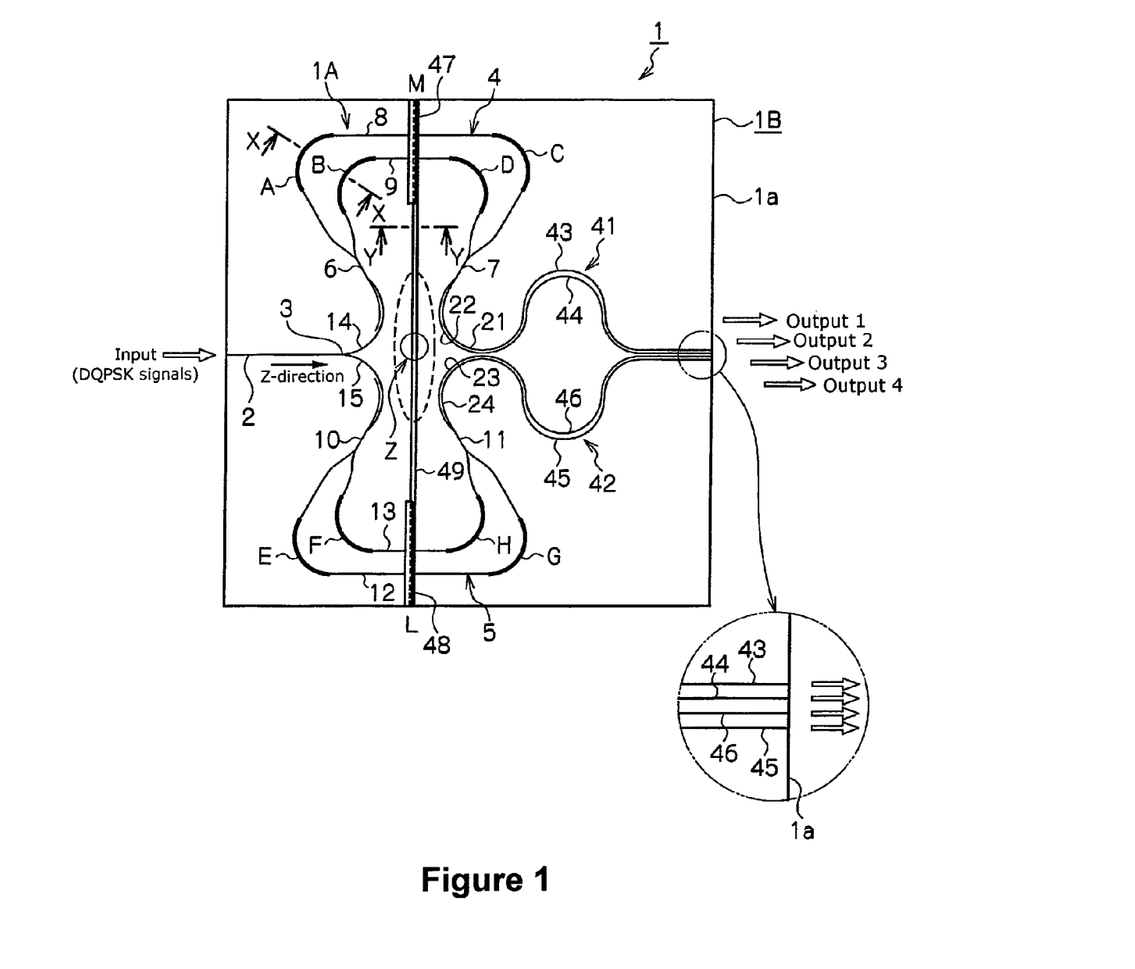
FIG. 1 is a plan view of a delay demodulation device in one embodiment of the present invention.
Figure 2:
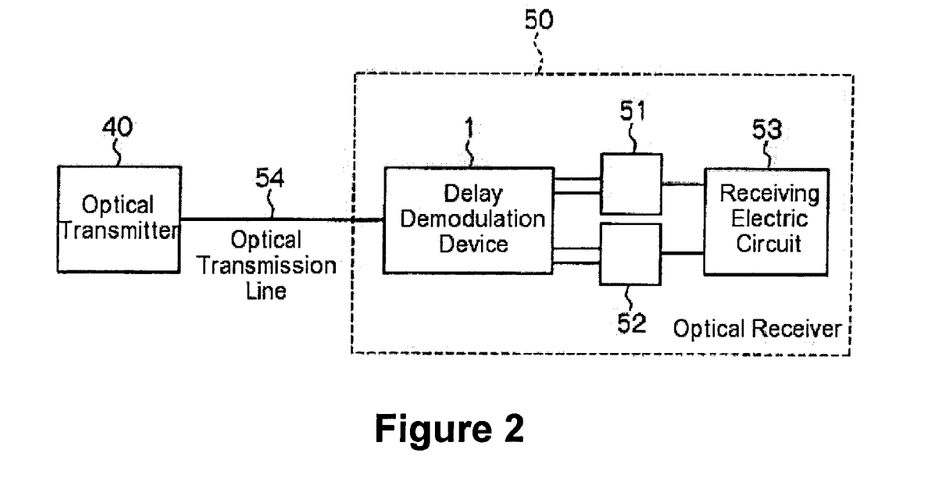
FIG. 2 is a block diagram of an optical transmission system with Differential Quadrature Phase Shift Keying (DQPSK)
Figure 3:
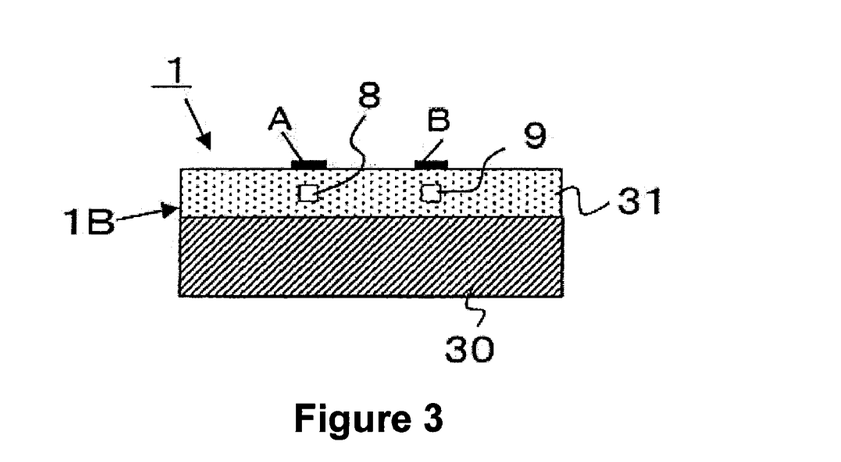
FIG. 3 is a cross-sectional drawing taken along line X-X in FIG. 1.
Figure 4:
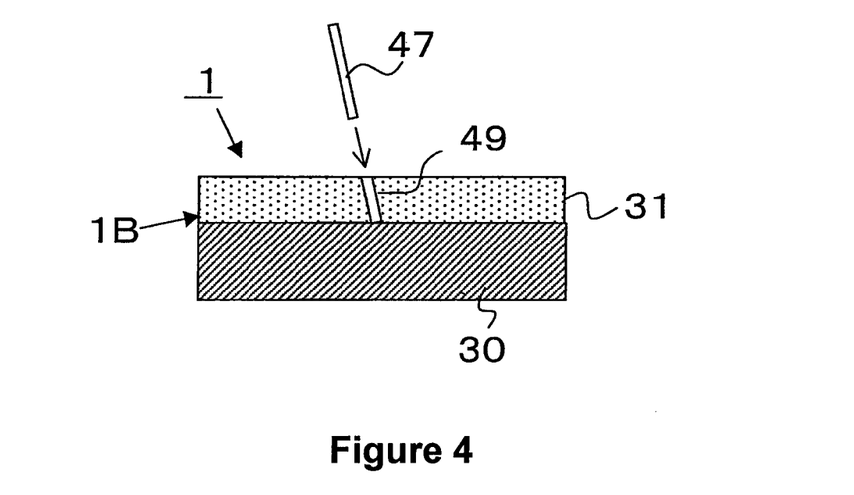
FIG. 4 is a cross-sectional drawing taken along line Y-Y in FIG. 1.
Figure 5:
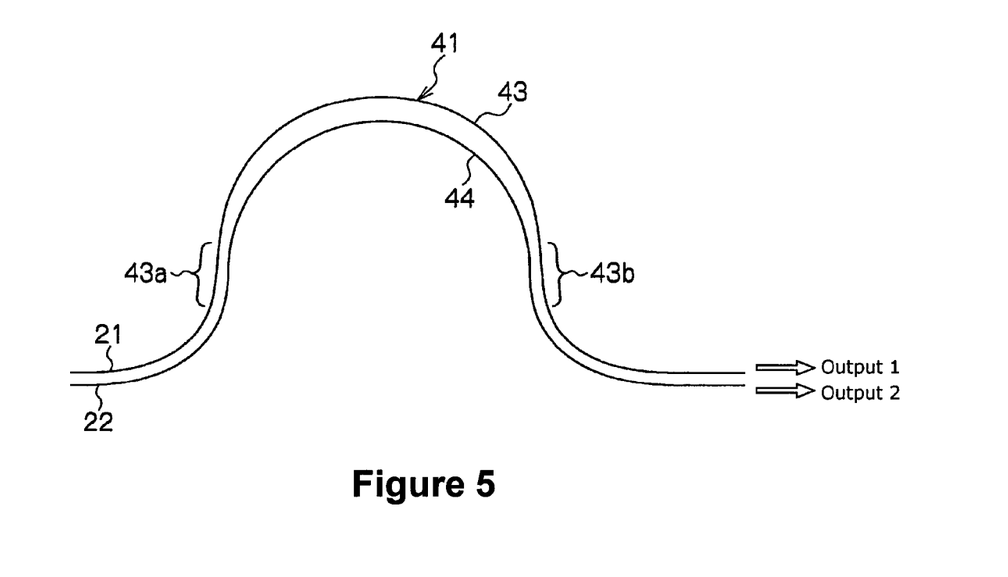
FIG. 5 is a closeup view of the first delay portion of the delay demodulation device shown in FIG. 1.
Figure 6:
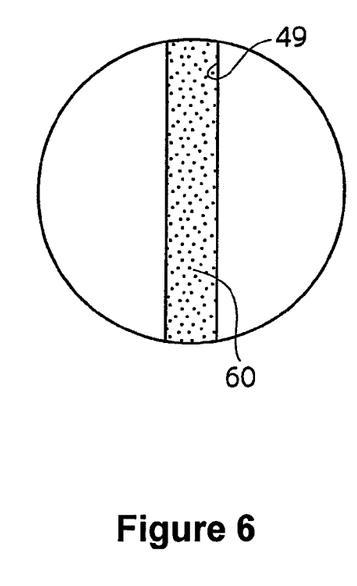
FIG. 6 is a closeup view of the Z portion indicated in FIG. 1.
Figure 7:
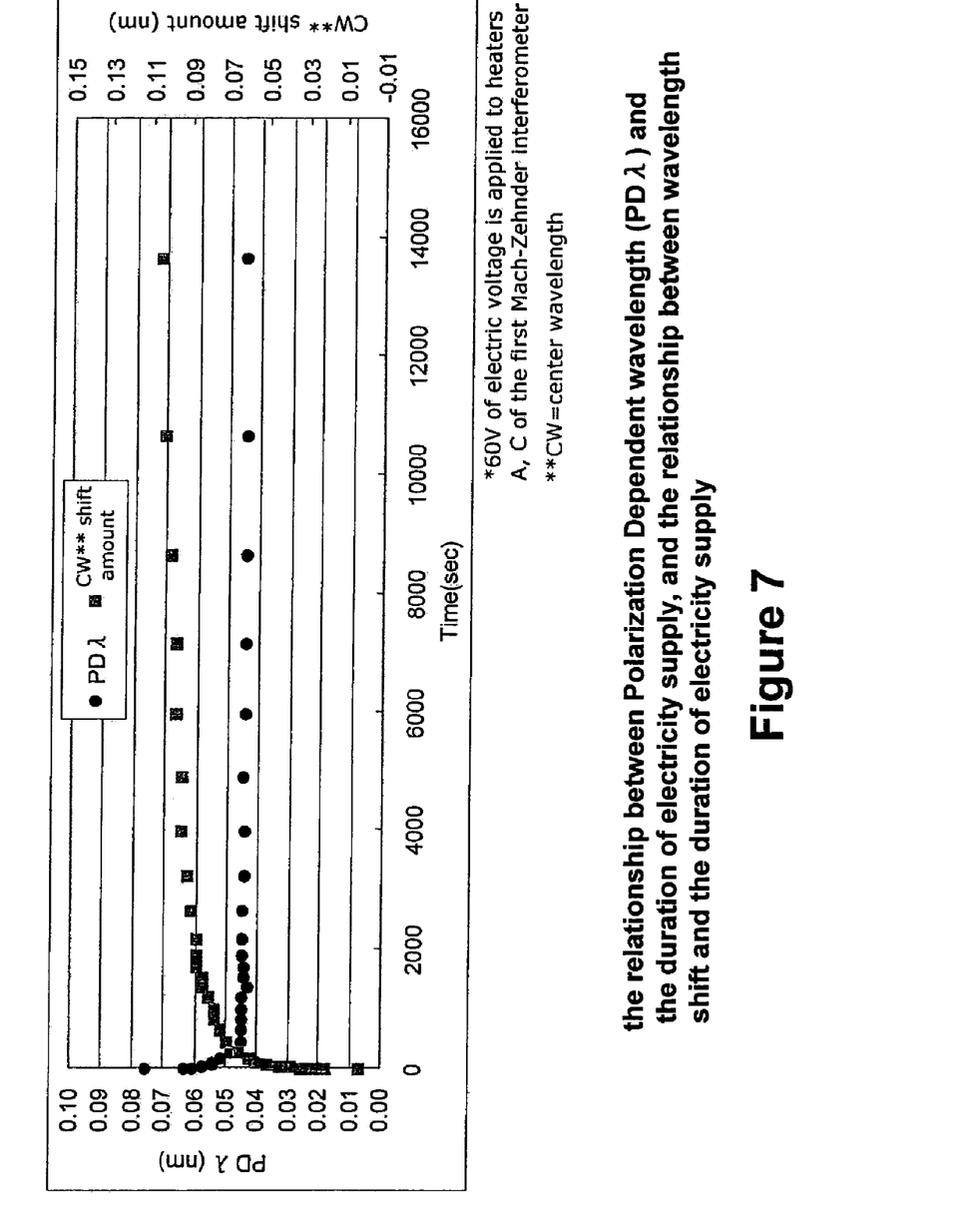
FIG. 7 is a chart showing the relationship between Polarization Dependent wavelength (PDλ) and the duration of electricity supply, and the relationship between wavelength shift and the duration of electricity supply in the delay demodulation device shown in FIG. 1.
Figure 8A:
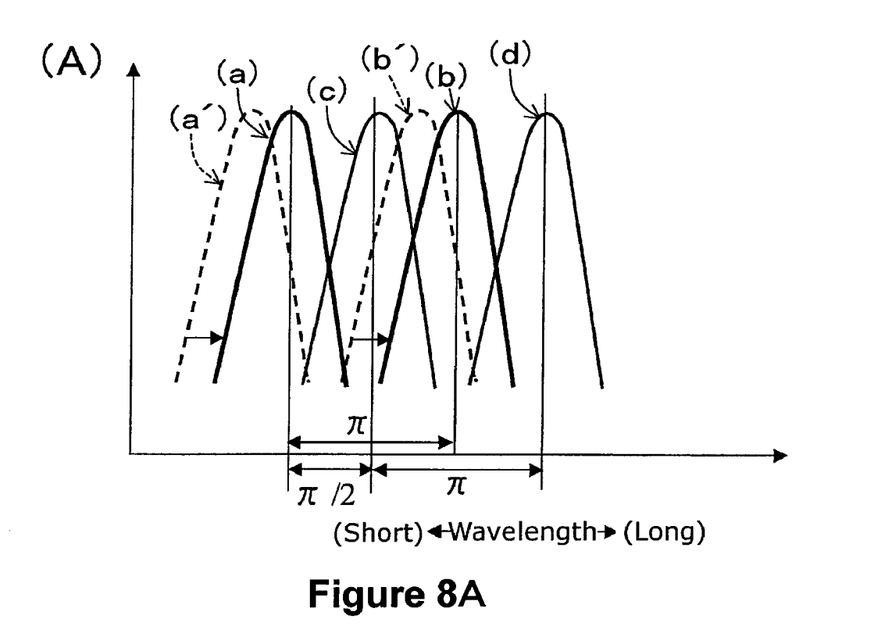
FIGS. 8A and 8B show the relationships between wavelength shift and heaters.
Figure 8B:
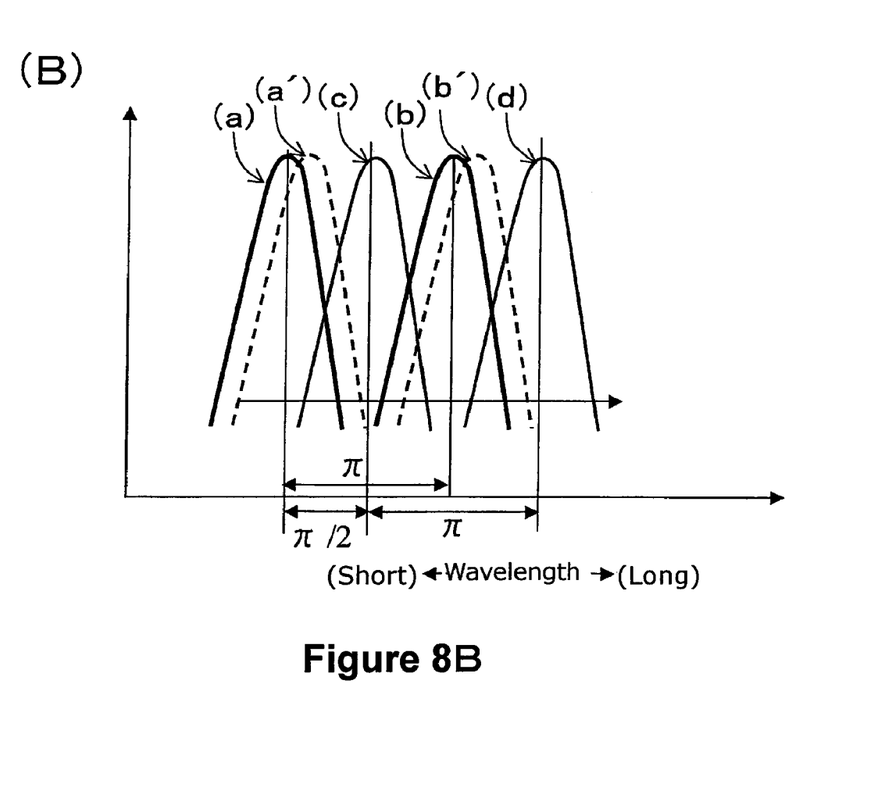
Figure 9:
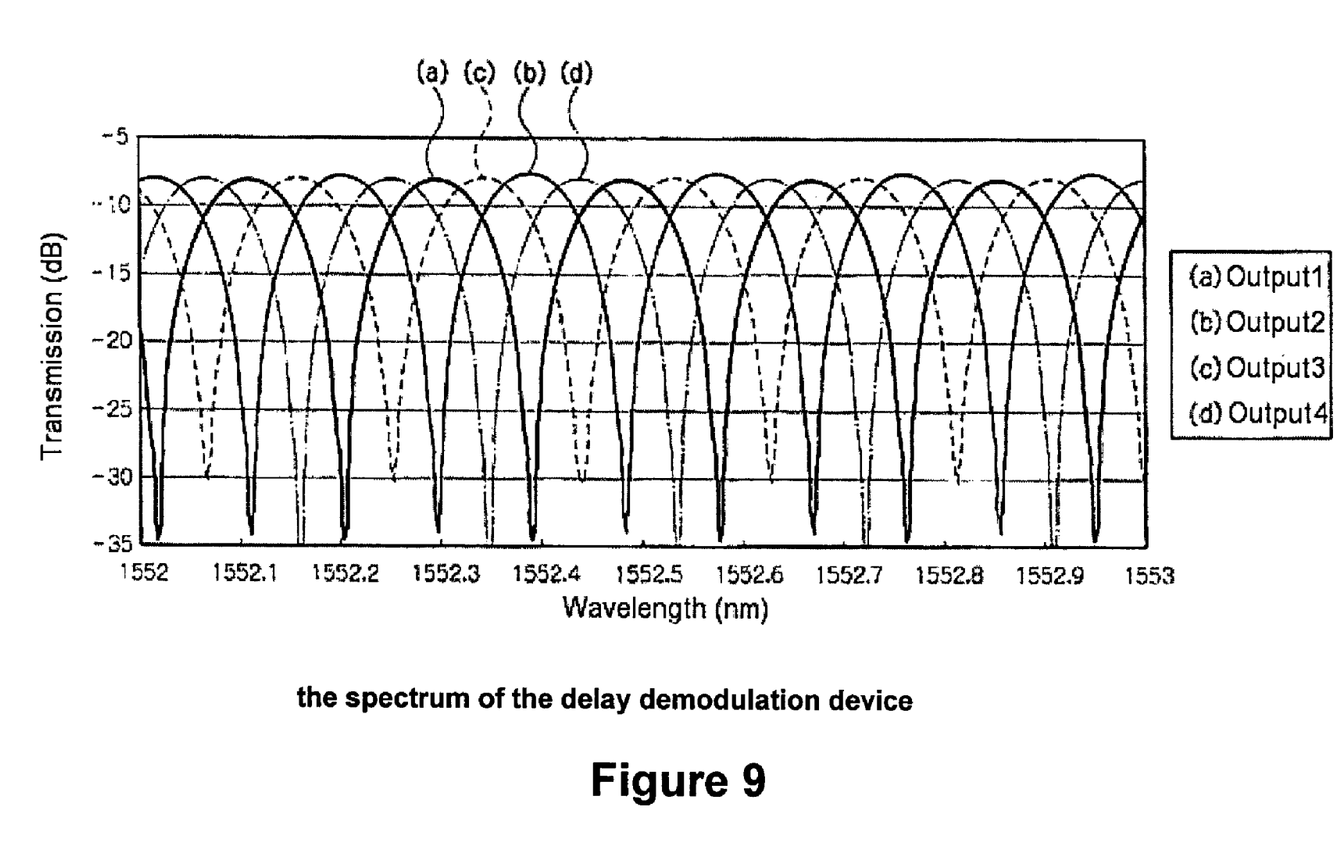
FIG. 9 is a graph showing the spectrum of the manufactured delay demodulation device.

FIG. 1 is a plan view of a delay demodulation device in one embodiment of the present invention. FIG. 2 is a block diagram of an optical transmission system with Differential Quadrature Phase Shift Keying (DQPSK). FIG. 3 is a cross-sectional drawing taken along line X-X in FIG. 1, FIG. 4 is a cross-sectional drawing taken along line Y-Y in FIG. 1. FIG. 5 is a closeup view of the first delay portion of the delay demodulation device shown in FIG. 1, FIG. 6 is a closeup view of the Z portion indicated in FIG. 1. FIG. 7 is a chart showing the relationship between Polarization Dependent wavelength (PDλ) and the duration of electricity supply, and the relationship between wavelength shift and the duration of electricity supply in the delay demodulation device shown in FIG. 1. FIGS. 8A and 8B show the relationships between wavelength shift and heaters. FIG. 9 is a graph showing the spectrum of the manufactured delay demodulation device.

(Construction of the Delay Demodulation Device)

Delay demodulation device 1 shown in FIG. 1 is a Planar Lightwave Circuit (PLC)-type delay demodulation device, which demodulates Differential Quadrature Phase Shift Keying (DQPSK) signals. Delay demodulation device 1 is, for example, a 40 Gbps DQPSK delay demodulation device used in a 40 Gbps DQPSK optical transmission system shown in FIG. 2.

In the optical transmission system, DQPSK signals are transmitted from an optical transmitter 40 to an optical fiber transmission line 54. In DQPSK signals, each symbol of information corresponds to a value (0, 1, 2 or 3), which comprises two bits of data, and the symbols of information are transmitted by shifting the phase of carrier wave between adjacent symbols by an amount ($\theta$, $\theta+\pi/2$, $\theta+\pi$ or $\theta+3\pi/2$) determined by the pair of bits to be transmitted. DQPSK signals transmitted from the optical fiber transmission line 54 to an optical receiver 50 are converted to optical signals with four different intensities by the delay demodulation device 1, and furthermore, the optical signals are converted to electric signals by balanced receivers 51 and 52. In a receiving electric circuit 53, various processes such as decryption are performed.

Delay demodulation device 1 shown in FIG. 1 comprises an input waveguide 2, which receives DQPSK signals; a Y-shape waveguide 3, which splits the input waveguide 2; a 2×2 first Mach-Zehnder interferometer 4; and a 2×2 second Mach-Zehnder interferometer 5.

The first Mach-Zehnder interferometer 4 comprises an input coupler 6 connected to one of its two waveguides, which are split by the Y-shape waveguide 3; an output coupler 7 connected to output waveguides; and two arm waveguides 8, 9, which are connected between the couplers 6, 7. The two arm waveguides 8, 9 have different lengths. Similarly, the second Mach-Zehnder interferometer 5 comprises an input coupler 10 connected to the other waveguide, which is split by the Y-shape waveguide 3; an output coupler 11 connected to output waveguides; and two arm waveguides 12, 13, which are connected between the both couplers 10, 11. The two arm waveguides 12, 13 have different lengths.

The input couplers 6, 10 and the output couplers 7, 11 are 2 input×2 output-type, 3 dB couplers (50% directional couplers). One end of the input coupler 6 of the first Mach-Zehnder interferometer 4 is connected to waveguide 14, and one end of the input coupler 10 of the second Mach-Zehnder interferometer 5 is connected to waveguide 15.

Also, the two output ends (a through port and a cross port) of the output coupler 7 of the first Mach-Zehnder interferometer 4 are connected to the first and second output waveguides 21, 22, respectively. In a similar fashion, the two output ends (a through port and a cross port) of the output coupler 11 of the second Mach-Zehnder interferometer 5 are connected to the third and fourth output waveguides 23, 24, respectively.

Also, in the two arm waveguides 8, 9 of the first Mach-Zehnder interferometer 4, there is a difference in length of the waveguides, ΔL, to make phase shift of the DQPSK signal in one end (i.e. the arm waveguide 8) delay by π radians with respect to the other (i.e. the arm waveguide 9). In a similar fashion, in the two arm waveguides 12, 13 of the second Mach-Zehnder interferometer 5, there is a difference in length of the waveguides, ΔL, to make the phase shift of the DQPSK signal in one end (i.e. arm waveguide 12) delay by π radians with respect to the other (i.e. arm waveguide 13).

Both ends of the arm waveguides 8, 9 of the first Mach-Zehnder interferometer 4 and both ends of the arm waveguides 12, 13 of the second Mach-Zehnder interferometer 5 are bent toward the center portion of the PLC 1A (i.e. the center portion of the PLC chip 1B, which includes the PLC 1A) as shown in FIG. 1. Here, the PLC circuit includes an input waveguide 2, a Y-shape waveguide 3, and first and second Mach-Zehnder interferometers 4, 5, all made from fused silica. The delay demodulation device 1 comprising the PLC 1A is manufactured as follows.

With flame hydrolysis deposition (FHD), silica material ($SiO_2$-type glass particles), which makes a lower cladding layer and a core layer, is deposited on a PLC base plate 30 (such as a silica base plate) as shown in FIG. 3. Then, a glass coating made by the deposition is fused (and becomes transparent) by adding heat. Later, desired waveguides are created by photolithography and reactive ion etching, and an upper cladding is created with FHD also. In FIG. 3, on the PLC base plate 30, a cladding layer 31 is created by combining the lower cladding layer and the upper cladding layer; and the arm waveguides 8, 9 are created as a core layer inside cladding layer 31. The PLC base plate 30 is approximately in square planar shape as shown in FIG. 1.

Also, the two waveguides 14, 15 split by the Y-shape waveguide 3 are bent upward and downward, respectively, to create a space between the two as shown in FIG. 1. One of the split waveguides 14 is connected to one of the two input ends of the input coupler 6 of the first Mach-Zehnder interferometer 4, and the other split waveguide 15 is connected to one of the two input ends of the input coupler 10 of the second Mach-Zehnder interferometer 5. Here, the DQPSK signal propagates through the input waveguide 2 in the Z-direction. Waveguide 14 is approximately perpendicular to the Z-direction and is bent upward with a curvature as shown in FIG. 1. On the other hand, waveguide 15 is approximately perpendicular to the Z-direction, but is bent downward with a curvature as shown in FIG. 1.

Also, the two output ends (a through port and a cross port) of the output coupler 7 of the first Mach-Zehnder interferometer 4 are connected to the first and second output waveguides 21, 22, respectively. In a similar fashion, the two output ends (a through port and a cross port) of the output coupler 11 of the second Mach-Zehnder interferometer 5 are connected to the third and fourth output waveguides 23, 24, respectively. The first and second output waveguides 21, 22 and the third and fourth output waveguides 23, 24 are bent to come close to each other as shown in FIG. 1.

More particularly, the first and second output waveguides 21, 22 extend downwardly from the two output ends of the output coupler 7 with a curvature and are approximately perpendicular to the Z-direction. Because of such curvature, the second output waveguide 22 is longer than the first output waveguide 21. In similar fashion, the third and fourth output waveguides 23, 24 extend upwardly from the two output ends of the output coupler 11 with a curvature and are approximately perpendicular to the Z-direction. Because of such curvature, the third output waveguide 23 is longer than the fourth output waveguide 24.

The first Mach-Zehnder interferometer 4 is at the upper center portion of the PLC 1A, and the second Mach-Zehnder interferometer 5 is at the lower center portion of the PLC 1A as shown in FIG. 1. More particularly, the first and second Mach-Zehnder interferometers 4, 5 are symmetric to each other with respect to a virtual center line on the PLC chip 1B, for example a straight line extending from the input waveguide 2 in the Z-direction.

The center portion of the arm waveguides 8, 9 of the Mach-Zehnder interferometer 4 and the center portion of the arm waveguides 12, 13 of the Mach-Zehnder interferometer 5 are parallel to each other.

Also, a first delay portion 41 is placed in the first and second output waveguides 21, 22 to match the lengths of those two output waveguides 21, 22 as shown in FIG. 1. The first delay portion 41 includes a waveguide 43 connected to the first output waveguide 21, and a waveguide 44 connected to the second output waveguide 22, which is longer than the first output waveguide 21 as shown in FIGS. 1 and 5. The two waveguides 43, 44 of the first delay portion 21 is curved convexly upward with respect to the above mentioned virtual center line. The waveguide 43 has two straight portions 43a, 43b to extend the waveguide 43 such that the waveguide 43 is longer than the waveguide 44 as shown in FIG. 5. The output ends of output waveguides 43, 44 of the first delayed portion 41 are output ports (a first output port and a second output port), which has outputs 1, 2 of the optical signals (a) and (b) in FIG. 8, respectively, wherein the phase of one output signal is shifted by π radians with respect to the other.

Also, a second delay portion 42 is placed in the third and fourth output waveguides 23, 24 to match the lengths of those two output waveguides 23, 24. The second delay portion 42 includes a waveguide 45 connected to the fourth output waveguide 24, and a waveguide 46 connected to the third output waveguide 23, which is longer than the fourth output waveguide 24 as shown in FIG. 1. The two waveguides 45, 46 of the second delay portion 42 is curved downward convexity with respect to the above mentioned virtual center line. The waveguide 45 has two straight portions similar to the straight portions 43a, 43b in FIG. 5 to extend the waveguide 45 such that the waveguide 45 is longer than the waveguide 46. The output ends of output waveguides 46, 45 of the second delayed portion 42 are output ports (a first output port and a second output port), which has outputs 3, 4 of optical signals (c) and (d) in FIG. 8, respectively, wherein the phase of one output signal is shifted by π radians with respect to the other.

The first Mach-Zehnder interferometer 4 includes a first heater A and a second heater C placed on the arm waveguide 8, and a third heater B and a fourth heater D placed on the arm waveguide 9 as shown in FIGS. 1 and 3. In similar fashion, the second Mach-Zehnder interferometer 4 includes a first heater E and a second heater G placed on the arm waveguide 12, and a third heater F and a fourth heater H placed on the arm waveguide 13 as shown in FIG. 1. Heaters A~H are placed above the corresponding arm waveguides, and the heaters are Tantalium compound thin film heaters made by a weld slag, which are placed onto the upper cladding (the cladding layer 31 in FIG. 3). In FIG. 3, the heaters A, B are placed above the cladding layer 31 of the arm waveguides 8, 9 as shown.

Also, to reduce PDλ, half-wave plates 47, 48 are inserted at the center portions of the Mach-Zehnder interferometers 4, 5, respectively, as shown in FIG. 1. Groove 49, which receives the half-wave plates 47, 48, is placed on the straight line M-L in FIG. 1, which passes through the center portions of Mach-Zehnder interferometers 4, 5. Also, to block leaked light from the Y-shape waveguide 3, the groove 49 is placed on the opposite side of the input waveguide 2 with respect to the Y-shape waveguide 3.

Furthermore, the groove 49 is tilted by 8° to make the half-wave plates 47, 48 tilt by 8° as shown in FIG. 4, to prevent loss due to reflections by the half-wave plates 47, 48.

The center portion of the groove 49 (i.e. the portion facing the Y-shape waveguide 3 and marked as section Z in FIG. 1), is filled with a resin 60 to block the leaked light from the Y-shape waveguide 3 more effectively, as shown in FIG. 6.

In the delay demodulation device 1, the DQPSK signal transmitted from the optical fiber transmission line 54 to the optical receiver 50 is split by the Y-shape waveguide 3. The split DQPSK signals propagate through the two arm waveguides 8, 9 (each having a different length) of the first Mach-Zehnder interferometer 4. The Mach-Zehnder interferometer 4 shifts the phase of the DQPSK signal transmitted in one arm waveguide 8 by one symbol (i.e. π radians) with respect to the phase of the signal in the other arm waveguide 9. Similarly, the second Mach-Zehnder interferometer 5 shifts the phase of the DQPSK signal transmitted in one arm waveguide 12 by one symbol (i.e. π radians) with respect to the phase of the signal in the other arm waveguide 13.

(Methods to Control Phase Shift)

Next, methods to control phase shifts of the above PLC-type delay demodulation device are explained.

The method to control phase shifts of the delay demodulation device includes the following steps (first step to third step)

(First Step)

First, electricity is supplied to the predetermined heater(s) on the two arm waveguides of the Mach-Zehnder interferometers 4, 5 such that PDλ is decreased as electricity is supplied to the predetermined heater(s).

More specifically, for the first Mach-Zehnder interferometer 4, among the two heaters A, C on the arm waveguide 8 and the two heaters B, D on the arm waveguide 9, electricity is supplied to the heater(s) that reduces PDλ (e.g. heaters A, C). Then, for the second Mach-Zehnder interferometer 5, among the two heaters E, G on the arm waveguide 12 and the two heaters F, H on the arm waveguide 13, electricity is supplied to the heater(s) that reduces PDλ (e.g. heaters E, G).

As shown in FIG. 7, when the heaters A, C are used, the wavelength shifts according to the time duration of electricity supply, and PDλ is reduced from the initial PDλ after a relatively short time. Thereafter, PDλ stays constant after a certain amount of time. Since electricity is supplied to the heaters A, C on the arm waveguide 8 (longer waveguide than arm waveguide 9), the wavelength shifts to the long wavelength side. Also, the electricity supply ends when PDλ no longer changes (i.e. no more reduction in PDλ). In this case, outputs 1, 2 of the optical signals (a), (b) in FIG. 9 shifts to the long wavelength side by keeping the phase difference between the outputs 1, 2 of the optical signals (a), (b) the same (i.e. phase difference of π radians with respect to each other).

Similarly, as shown in FIG. 7, when the heaters E, G are used, the wavelength shifts according to the time duration of electricity supply, and PDλ is reduced from the initial PDλ after a relatively short time. Thereafter PDλ stays constant after a certain amount of time. Since electricity is supplied to the heater E, G on the arm waveguide 12 (longer waveguide than arm waveguide 13), the wavelength shifts to the long wavelength side. Also, the electricity supply ends when PDλ no longer changes (i.e. no more reduction in PDλ). In this case, outputs 3, 4 of the optical signals (c), (d) in FIG. 9 shifts to the long wavelength side by keeping the phase difference between the outputs 3, 4 of the optical signals (c), (d) the same (i.e. phase difference of π radians with respect to each other).

(Second Step)

After PDλ is reduced in the first step, a half-wave plate 47 is inserted in the center portion of the two arm waveguides 8, 9 of the first Mach-Zehnder interferometer 4, and another half-wave plate 48 is inserted in the center portion of the two arm waveguides 12, 13 of the second Mach-Zehnder interferometer 5.

(Third Step)

After the half-wave plates 47, 48 are inserted, electricity is supplied again to the predetermined heater(s) on the at least one of the Mach-Zehnder interferometers 4, 5 used in the first step to control phases such that the phase of the first Mach-Zehnder interferometer 4 is shifted by π/2 radians with respect to the phase of the second Mach-Zehnder interferometer 5.

In this embodiment, since the heaters A, C of the first Mach-Zehnder interferometer 4 are used to reduce PDλ in the first step, electricity is supplied to heaters A, C to control the phases between the two Mach-Zehnder interferometers 4, 5, so that the phase of the first Mach-Zehnder interferometer 4 is shifted by π/2 radians with respect to the phase of the second Mach-Zehnder interferometer 5. As shown in FIG. 9, phase shift (or phase-shift trimming) is performed to the first and second Mach-Zehnder interferometers by using the heaters A, C so that the phases of the outputs 1, 2 of the optical signals (a), (b) is shifted by π/2 radians with respect to the phase of the outputs 3, 4 of the optical signals (c), (d).

The above mentioned third step is explained in detail by using FIGS. 8 (A) and 8(B).

FIG. 8A shows a case wherein the shift amount is smaller to shift the center wavelengths of optical signals (a) and (b) toward long wavelength side than short wavelength side to control the phase shift to be π/2 radians between the two Mach-Zehnder interferometers 4, 5. Spectrum (a') and (b') in FIG. 8A shows outputs 1, 2 of optical signals, which are shifted toward short wavelength side than the target position of the outputs 1, 2 of the optical signals (a) and (b). The target position is decided such that when phase shift control is performed between the two Mach-Zehnder interferometers 4, 5, the difference in the phase shifts of outputs 1, 2 of the optical signals (a) and (b) is π/2 radians with respect to the outputs 3, 4 of optical signals (c) and (d). In this case, the same heaters used to reduce PDλ in the first step (i.e. the heaters A, C on the longer arm waveguide 8) are used to shift the phases toward long wavelength side such that the difference in the phases between the two Mach-Zehnder interferometers 4, 5 is π/2 radians.

FIG. 8B shows a case wherein the shift amount is smaller to shift the center wavelengths of signals (a) and (b) toward the short wavelength side than the long wavelength side to control the phase shift to be π/2 radians between the two Mach-Zehnder interferometers 4, 5. Spectrum (a') and (b') in FIG. 8B shows outputs 1, 2 of optical signals, which are shifted toward long wavelength side than the target position of the outputs 1, 2 of the optical signals (a) and (b). The target position is decided such that when phase shift control is performed between the two Mach-Zehnder interferometers 4, 5, the difference in the phase shift of outputs 1, 2 of the optical signals (a) and (b) is π/2 radians with respect to the outputs 3, 4 of optical signals (c) and (d). In this case, different heaters (i.e. the heaters B, D on the shorter arm waveguide 9) from the ones used to reduce PDλ in the first step are used to shift the phases toward the short wavelength side. However, if the phases are shifted to the short wavelength side, PDλ increases. Because of that, in the third step, even if the shift amount to shift the center wavelengths of optical signals (a) and (b) toward the short wavelength side is smaller than that toward the long wavelength side, the same heater(s) used to reduce PDλ in the first step are used.

Also, in the above second step, preferably, when the half-wave plates 47, 48 are inserted at the center portions of the two arm waveguides of Mach-Zehnder interferometers 4, 5, each half-wave plate is fixed to the predetermined location on the PLC 1A such that the PDA, is minimized. Such location can be found by monitoring the PDλ when the half-wave plates are fixed.

Embodiments

Delay demodulation device 1 has a PLC 1A on a silica base plate 30 shown in FIG. 3. The PLC 1A comprises: an input waveguide 2; a Y-shape waveguide 3; Mach-Zehnder interferometers 4, 5; output waveguides 21-24; and two delayed portions 41, 42, wherein all of the components are made from silica glass. To create the demodulation device 1 FHD method, photolithography, and reactive ion etching are used.

The manufactured delay demodulation device 1 includes heaters A~H wherein the heaters A~H are Tantalum compound thin film heaters made by weld slag. The size of each heater A~H is 5000 μm by 60 μm and the resistance of the heaters are approximately the same. When PDλ of the first Mach-Zehnder interferometer is measured before the half-wave plate 47 is inserted, the PDλ was 0.074 nm as shown in FIG. 7. After that, electricity (60V for 250 seconds) was supplied to the heaters A, C of the first Mach-Zehnder interferometer, and then, the phase plate is inserted to the center portion of the first Mach-Zehnder interferometer. The electricity supply ends when PDλ no longer changes (i.e. no more reduction in PDλ). When PDλ was measured, PDλ of the first Mach-Zehnder interferometer was 3 pm (i.e. 0.003 nm).

The half-wave plate 48 is inserted in the second Mach-Zehnder interferometer in a similar way. Then, to create a phase shift difference of π/2 radians between the first and second Mach-Zehnder interferometers, phase shift control is performed by using the heaters A, C of the first Mach-Zehnder interferometers (60V of electricity is supplied to each heater). When the shifts are made, there are no PDλ changes (i.e. PDλ=3 pm) in the second Mach-Zehnder interferometer, and only phase shift occurs. By doing so, phase control is achieved between the first and second Mach-Zehnder interferometers as shown in FIG. 9.

In FIG. 9, the outputs 1, 2 of the optical signals (a), (b) are output from the output ends (i.e. the first and second output ports) of the waveguides 43, 44 of the first delayed portion 41. Similarly, the outputs 3, 4 of the optical signals (c), (d) are output from the output ends (i.e. the third and fourth output ports) of the waveguides 46, 45 of the second delayed portion 42. As shown in FIG. 9, the optical signals (a), (b) are shifted by π radians with respect to the optical signals (c), (d). Furthermore, the optical signals (a), (b), (c), (d) are shifted by π/2 radians with respect to the adjacent optical signals.

According to the embodiment presented above, the following advantages can be achieved.

In the first step, electricity is supplied to the predetermined heater(s) on the two arm waveguides of the first and second Mach-Zehnder interferometers 4, 5 such that PDλ is reduced as electricity is supplied to the predetermined heater(s) as shown in FIG. 7.

After PDλ is reduced in the first step, by inserting the half-wave plates 47, 48 in the center portions of the two arm waveguides of each Mach-Zehnder interferometer 4, 5, PDλ can be further reduced.

After the half-wave plates 47, 48 are inserted, electricity is supplied again to the predetermined heater(s) on the at least one of the Mach-Zehnder interferometers 4, 5 used in the first step to control phases such that the phase of the first Mach-Zehnder interferometer 4 is shifted by π/2 radians with respect to the phase of the second Mach-Zehnder interferometer 5. Because of that, the reduced PDλ (in first and second steps) is kept relatively constant, and, at the same time, the phase shift difference is π/2 radians between the first and second Mach-Zehnder interferometers 4, 5.

From the reasons above, the delay demodulation device to reduce PDλ to be less than, for example, 0.5 GHz (i.e. 0.004 nm) is manufactured.

In the above second step, when the half-wave plates 47, 48 are inserted at the center portions of the two arm waveguides of Mach-Zehnder interferometers 4, 5, each half-wave plate is fixed to the predetermined location on the PLC 1A such that the PDλ is minimized. Such location can be found by monitoring the PDλ when the half-wave plates are fixed. By doing so, a delay demodulation device with low PDλ can be manufactured.

In the third step of the above embodiment, electricity is supplied to the heaters on the first Mach-Zehnder interferometer 4 (e.g. heaters A, C) for phase shift control; however, the same heaters, which were used to reduce initial PDλ on the second Mach-Zehnder interferometer (e.g. heaters E, G) can be used in conjunction with the heaters A, C to control the phase shift. Alternatively, in the third step of the above embodiment, to perform phase shift control, electricity can be supplied to the same heaters, which were used to reduce initial PDλ on the second Mach-Zehnder interferometer (e.g. heaters E, G) and not to the heaters on the first Mach-Zehnder interferometer 4.

Also, in the above first step, the supplied voltage to reduce PDλ was 60V; however, the voltage can be changed to desired amount by changing the length and/or the width of the heater.

Also, the methods to control phase shifts described in the above embodiments are not limited to the PLC-type delay demodulation device 1 shown in FIG. 1, but also can be applied to other PLC-type delay demodulation device, which demodulates DQPSK signals. For example, the present invention can be applied to a wide range of PLC-type delay demodulation devices, which includes 2×2 two Mach-Zehnder interferometers with two arm waveguides having different lengths to receive split DQPSK signals, and heaters on the two arm waveguides of each Mach-Zehnder interferometer.

The present invention is not limited to the above described embodiments and various and modifications may be possible without departing from the scope of the present invention.

What is claimed is:

1. A method to control phase shift in a Planar Lightwave Circuit (PLC) for demodulating Differential Quadrature Phase Shift Keying (DQPSK) comprising two Mach-Zehnder interferometers, each having two arm waveguides having different lengths with respect to each other to receive a split DQPSK signal and having heaters placed on the two arm waveguides, the method comprising the steps of:

(first step) supplying electricity to at least one predetermined heater on the two arm waveguides of each Mach-Zehnder interferometer such that Polarization Dependent wavelength (PDλ) is reduced as electricity is supplied to the predetermined heaters;

(second step) inserting a half-wave plate in the two arm waveguides of each Mach-Zehnder interferometer after PDλ is reduced in the first step;

(third step) supplying electricity to the predetermined heater on the at least one of the two Mach-Zehnder interferometers used in the first step to control phases of the DQPSK signals after the half-wave plates are inserted.

2. The method of claim 1, wherein one heater is placed on each of the two arm waveguides of each Mach-Zehnder interferometer, and electricity is supplied to the predetermined heater on one of the two arm waveguides of each Mach-Zehnder interferometer such that PDλ is reduced as electricity is supplied to the predetermined heater on each Mach-Zehnder interferometer.

3. The method of claim 1, wherein two heaters are placed on each of the two arm waveguides of each Mach-Zehnder interferometer, and electricity is supplied to the two predetermined heaters on one of the two arm waveguides of each Mach-Zehnder interferometer such that PDλ is reduced as electricity is supplied to the predetermined heaters on each Mach-Zehnder interferometer.

4. The method of claim 2 or 3, wherein when each of the inserted half-wave plates is fixed on the PLC after the second step, a predetermined location for each half-wave plate is decided by monitoring the PDλ such that the PDλ is minimized at the location.

* * * * *